INVENTOR.
WILLIAM L. DAVIS

ATTORNEYS

April 27, 1965  W. L. DAVIS  3,180,237
APPARATUS FOR MAKING BAGS
Filed Aug. 19, 1964  5 Sheets-Sheet 2

INVENTOR.
WILLIAM L. DAVIS
BY
Dunlap & Laney
ATTORNEYS

INVENTOR.
WILLIAM L. DAVIS
BY
ATTORNEYS

INVENTOR.
WILLIAM L. DAVIS
BY
Dunlap & Laney
ATTORNEYS

3,180,237
APPARATUS FOR MAKING BAGS
William L. Davis, P.O. Box 2003, Cullendale Station,
Camden, Ark.
Filed Aug. 19, 1964, Ser. No. 390,637
22 Claims. (Cl. 93—27)

This invention relates to improvements in apparatus for making paper and plastic bags. More specifically, the present invention relates to improvements in apparatus of the type used for forming so-called gusseted or bellows fold type bars having a bottom fold which permits the bag to be self-opening. Such bottom folds may be either of a diamond configuration and of the so-called satchel bottom type, or may be of the self-opening square bottom (S.O.S.) type.

Since about 1875, a great many developments and improvements have been made in machines and apparatus for forming paper and plastic bags of the type having gussets formed in the sides thereof, and having flaps which are folded together and sealed with adhesive to provide a strong leak-proof bottom. In the great majority of these machines, the formation of the bottom of the bag is accomplished on what has been variously termed a forming, finishing or gripper cylinder or drum, which is a large revolving cylindrical member which rotates at relatively high speeds, and which carries in spaced sequence around its periphery, a plurality of tubes to be formed into closed bottom bags. These tubes are acted on by various gripping, opening, pasting and folding mechanical elements to form the leading end of the tube into a generally diamond or square configuration with side flaps, a trailing flap and a leading flap. These flaps are folded together in overlapping relation and sealed with adhesive to form the bottom of the bag.

As is well understood in the art, the finishing cylinder is usually provided with a number of circumferentially spaced stations disposed on the periphery of the cylinder for engaging a plurality of paper tubes corresponding in number to the number of stations. The tubes, which have been previously formed with gusseted sides and with a longitudinal seam prior to being fed to the finishing cylinder, are opened out by various types of apparatus in the course of the revolution of the finishing cylinder, and the appropriate folds are made in the leading end of the tubes in order to form the bottom thereof. These operations which are performed on the leading end of each tube as the tube is carried by the cylinder through an arc of approximately 180° or one-half revolution of the cylinder usually include at least a paste or adhesive applying step, a tucking or creasing step and a plurality of final flap folding steps.

In the case of both satchel bottom bag formation, and self-opening square bottom bag formation, the tucking step usually entails the pressing of the bag into transverse indentations in the cylinder along certain predetermined transverse fold lines in the bag which will define the inner edges or fold lines of the leading and trailing bottom flaps of the bag. The bags are usually several layers thick along these transverse fold lines, and are pressed into the transverse indentations in the cylinder by revolving tucker blades mounted on an auxiliary drum or cylinder spaced from the finishing cylinder, and having its axis extending parallel to the rotational axis of the finishing cylinder. Once the bags have been pressed into the indentations, they are gripped along the fold lines by spring-biased, cam actuated clamps or gripping elements. Pressing of the bags into the transverse indentations of the finishing cylinder causes the leading and trailing bottom flaps of the bags to stand upwardly from the peripheral surface of the finishing cylinder and they then remain in this position as the cylinder continues to rotate.

After the tucking step has been performed on the bag tubes carried by the finishing cylinder, the upstanding leading and trailing bottom flaps of the bag are folded into superimposed relation to each other by flap folding apparatus which generally includes at least two mechanical elements for acting individually on the leading flap and trailing flap, respectively. The types of structures which have previously been used for folding the trailing flaps of S.O.S. or satchel bottom bags may be generally classified as of four broad types. In some of the earlier types of bag forming machines, rotating flap folding elements mounted on shafts which were spaced from the finishing drum and extended parallel to the rotational axis thereof were employed. These elements biased the trailing flap toward the leading flap and downwardly toward the periphery of the finishing drum as the flap contacting elements carried by the rotating shaft swept through an arc intercepting the trailing flap at a speed of rotation substantially greater than the rotative speed of the finishing cylinder. The front flap of the bag was then, and generally continues to be, folded by a stationary creasing bar or finger which was positioned in the path of movement of the bag on the finishing cylinder periphery. This stationary finger struck the leading flap of the bag after the trailing flap had been folded downwardly and moved the leading flap into superimposed flattened relation over the trailing flap.

The rotating mechanisms used in early bag making machines for folding the trailing flap into position possessed the disadvantage of requiring a relatively large space and in being mechanically unreliable in many instances. Complicated mechanical movements, such as compound Whitworth motions and other linkages involving a number of moving parts and requiring precise synchronism for proper functioning, were involved in many of these mechanisms, yielding a high percentage of early mechanical failures and malfunctioning. In many instances of their employment, they were used in bag forming machines of the type in which the bag blanks were moved on a flat belt, rather than on a revolving finishing cylinder of the type hereinbefore described and now generally employed. Revolving flap folding elements of these general types are described in U.S. Patents 599,206 to West; 1,181,294 to Dulin; 511,171 to Stilwell; 1,583,-392 to Coty; 900,605 to Smith; 726,866 to Claussen; and 1,571,983 to Weber.

Another type of trailing flap folding mechanism which was used in some of the earliest rotating finishing cylinder bag forming machines, as well as in some of the more recent machines of this type, was that which utilized a reciprocating or oscillating finger or bar which made a rapid stroke in the direction of movement of the bag blank on the finishing cylinder so as to overtake and depress the trailing flap, followed by a retracting stroke in which the folding finger or arm moved back to its original position in a direction opposite to the direction of rotation of the finishing cylinder. Obviously, mechanical movements of this type must necessarily operate at extremely high speeds to accomplish both the folding and retracting strokes within the time elapsing between movement of two successive bags at two adjacent stations on the finishing cylinder past the point of contact with the flap folding element. Because the movements did involve a reversal of direction during the reciprocating or oscillating stroke, and because of the desirability of operating at high speeds, these mechanisms were subject to the limitation of early destruction or malfunctioning during the operating life of the bag forming machine, or else had necessarily to be operated at a lower speed, thus limiting the rate of production of bags which was possible. Flap folding mechanisms of this general type are described in U.S. Patents 2,125,307 to Novick; 1,742,174 to Coty et al.; and 1,567,437 to Hartman.

A third category of flap folding instrumentality which is presently used on a few bag forming machines of the rotating finishing cylinder type involves rotating bars or fingers which are mounted on a shaft extending in a direction which is generally parallel to a radius of the finishing cylinder and spaced to one side thereof with the flap folding fingers or bars rotating in a plane parallel to a tangent of the finishing cylinder. The Potdevin Machine Company of Teterboro, N.J., manufactures bag forming machines of this type.

The most widely used type of flap folding mechanism now employed for folding down the trailing flap of S.O.S. or satchel bottom type bags as the bag tubes are carried by the finishing cylinder is a continuous roller chain type folding mechanism in which a pair of spaced roller chains are each passed over three sprockets positioned at the vertices of a triangle, and over a curved bar or guide of some type between two of the sprockets and aligned with the curved peripheral surface of the finishing cylinder. A flap folding roller bar extends between, and is rotatably secured at its ends to, the spaced chains and moves through a curved path along the periphery of the finishing cylinder at a speed which is usually approximately twice the rotational speed of the finishing cylinder. The folding bar carried by the chains overtakes the upstanding trailing flap as it moves with the periphery of the cylinder and biases it to a down folded position preparatory to the leading flap of the bag being pressed downwardly over the trailing flap by a stationary curved finger or bar located ahead of the chain type back flap folding mechanism. Examples of the chain driven type of rear flap folding mechanism are the devices depicted and described in United States Patents 2,179,464 to Avery; 2,126,920 to Potdevin; 2,847,914 to Davis; 2,250,699 to Bischoff; 2,376,697 to Hurrey; 1,176,163 to Potdevin; and 2,044,476 to Koenig.

Although the roller chain driven flap folding mechanisms function fairly reliably for short periods in folding the trailing flaps of the bags to the position required for receiving the leading flaps in overlying or superimposed relation, the chain driven type flap folding mechanism has been characterized by a relatively short service life requiring frequent repair or replacement. The malfunctioning of the chain driven flap folders results from the very high speed at which the chain must be driven and the high stresses placed thereon which cause frequent breaking of the chain. In some instances, the roller chains move at a speed of between 1000 and 2000 feet per minute and the transverse flap folding roller or bar carried between the supporting chains will be caused to revolve about its axis at speeds as high as 12,000 r.p.m. by contact with guiding cam elements. Under these conditions, and operating the bag forming machines on a three-shift basis, the life of a chain driven flap folding mechanism is generally limited to approximately four weeks. If the flap folding mechanism is being operated at top speed at the time a failure or parting of one or both of the chains occurs, very extensive damage may be imparted to the expensive bag forming machine in the amount of several thousand dollars. Moreover, breaking of the driving chains or the roller carried thereby presents great danger to operating personnel.

The present invention provides an improved flap folding mechanism for use in forming the bottoms of S.O.S. or satchel bottom type bags. The mechanism is intended for use in combination with large finishing cylinders of the type hereinbefore described, and of the general type shown and described in the majority of the patents to which reference has hereinbefore been made. The flap folding apparatus functions to engage and bias downwardly and forwardly relative to the finishing cylinder, the upstanding trailing flap so that this flap is placed in a position to underlie the leading flap when the leading flap has been depressed by a stationary leading flap folding plate positioned in the path of travel of the bags on the finishing cylinder periphery. The rear flap folding mechanism of the invention is a mechanically sturdy, dynamically balanced system which is characterized by a much longer operating life than the chain driven flap folders of the type described, and which positively and reliably biases the trailing flap into its down folded position in properly timed sequence relative to the subsequent folding of the leading flap into position over the trailing flap.

Broadly described, yet without limitation to such description, the novel flap folding apparatus of the present invention which is utilized for folding the trailing flap of bags carried by the finishing cylinder into the desired position comprises a rotatably driven shaft spaced from the outer periphery of the finishing cylinder and extending generally parallel to the shaft upon which the finishing cylinder is rotatably mounted; at least one supporting arm extending radially from said rotatably driven shaft; a flap contacting element pivotally carried by said arm for pivotation about an axis extending substantially normal to said arm and substantially parallel to the shaft upon which the finishing cylinder is rotatably mounted; and means for imparting an oscillating movement to said flap contacting element through an arc of pivotation about the pivotal axis of said flap folding element so that said flap folding element is oscillated between a position in which it extends from said pivotal axis toward the finishing cylinder during the flap folding portion of its stroke, and a retracted position in which it is retracted inwardly toward the rotatably driven shaft carrying its supporting arm during the remaining portion of its stroke.

To more specifically describe one preferred embodiment of the present invention, the flap folding apparatus comprises a rotatably driven shaft spaced from the outer periphery of the finishing cylinder and extending generally parallel to the axis of rotation of the finishing cylinder; a pair of arms keyed to said shaft for rotation therewith and spaced from each other along said shaft, said arms extending radially from said shaft and generally parallel to each other; a plate supporting shaft extending between and journaled in said pair of arms at points radially spaced therealong from said first mentioned rotatably mounted shaft; an elongated flap folding plate secured along one of its longitudinal edges to said plate supporting shaft for pivoting movement about the axis of said plate supporting shaft when said plate supporting shaft is pivoted in the arms in which it is journaled; a rotatably mounted cam arm mounted for eccentric free rotation on said first mentioned shaft and having a radially outer end, said rotatably mounted cam arm being generally longitudinally slotted adjacent its radially outer end; a crank arm having one of its ends connected to said plate supporting shaft; a bearing block connected to and rotatably journaling the other end of said crank arm, said bearing block being slidably mounted in the slot in said cam arm for sliding movement therealong radially toward the axis of rotation of said cam arm; and a spring mounted in said slot and extending between said bearing block in the radially outer end of said slot for undergoing resilient deformation and compression upon sliding movement of said bearing block in said slot. In all embodiments of the invention, the flap contacting element which contacts and biases the rear flap of the partially formed bags to their down folded position is caused to undergo a pivotal movement which effectively (a) extends the flap folding element from the figure of revolution swept out by its pivotal axis toward the finishing cylinder for contact with the trailing flap at the time the flap folding element approaches closest to the cylinder, and (b) retracts the flap folding element in a movement in which the flap contacting element is pivoted from its extended, flap contacting position toward the figure of revolution swept out by its pivotal axis in order to permit the flap folding mechanism to be constructed more compactly and the flap contacting element thereof to clear certain fixed structures during rotation about its rotational axis. In the preferred embodiments of the invention, the flap contacting element undergoes an oscillating movement engendered by the eccentricity of the cam arm described above, in combination with the throw of the crank arm, also described above.

Since the novel flap folding mechanism of the present invention cooperates with certain other elements of the bag forming machine to produce substantially improved results, the inventive concepts of the present invention are also based in the determination that the novel cooperation between such other elements is highly desirable. This novel combination may be broadly described as comprising a rotatably mounted finishing cylinder; circumferentially spaced pairs of clamp elements carried by said cylinder at the periphery thereof, with the individual clamping elements in each pair of clamps being spaced circumferentially on said drum for clamping a partially formed bag along two spaced parallel fold lines; a first tucker mechanism positioned adjacent the periphery of said cylinder and including a rotatably mounted tucker blade cooperating at one point in time during its rotation with the trailing clamping element of each of said pairs of clamping elements; a second tucker mechanism positioned adjacent the periphery of said cylinder and spaced circumferentially around said finishing cylinder from said first tucker mechanism, said second tucker mechanism including a rotatably mounted tucker blade positioned for cooperation at one point in time during its rotation with the leading clamping element of each of said pairs of clamping elements; a trailing flap folding mechanism positioned adjacent said finishing cylinder and spaced circumferentially around said cylinder from said second tucker mechanism in the opposite direction from said first tucker mechanism, said trailing flap folding mechanism comprising (a) a rotatably mounted shaft spaced radially outwardly from the periphery of said finishing cylinder and extending substantially parallel to the axis of rotation thereof, (b) an elongated flap folding plate extending substantially parallel to the rotatably mounted shaft of said flap folding mechanism; (c) means rigidly interconnecting said flap folding plate and the rotatably mounted shaft of said flap folding mechanism for rotating said plate about the axis of said rotatably mounted shaft as said shaft is rotated, said means including means pivotally supporting said flap folding plate for pivotation about an axis extending parallel to the rotational axis of said finishing cylinder; and (d) means rotatably mounted on the shaft of said flap folding mechanism for pivoting said flap folding plate on its pivotal axis to extend said plate toward said finishing cylinder from said pivotal axis at some time during the portion of one revolution of said shaft and said flap folding mechanism when said plate is moving toward said finishing cylinder and for one-fourth of a revolution thereafter, and to pivotally retract said plate toward the shaft of said flap folding mechanism over at least a part of the remaining portion of said one revolution; a leading flap folding assembly positioned adjacent said finishing cylinder and spaced circumferentially around said cylinder from said trailing flap folding mechanism; and means synchronously driving said finishing drum, the rotatably mounted tucker blades of said tucker mechanisms and the rotatably mounted shaft of said trailing flap folding mechanism whereby the speed of rotation of the tucker blades of said tucker mechanisms is equal to the speed of rotation of said finishing cylinder multiplied by the number of pairs of clamping elements thereon, and the speed of rotation of said flap folding mechanism shaft is sufficient to impart a linear velocity to said flap folding plate which is substantially faster than the linear velocity of a point on the periphery of said finishing cylinder.

From the foregoing description of the invention, it will be perceived that the present invention affords a positive action trailing flap folding mechanism which can be more easily dynamically balanced, and more compactly constructed than chain driven type flap folding mechanisms of the type hereinbefore used, and that the mechanical reliability and safety with which bags employing finishing cylinders and trailing flap folding mechanisms can be used has been substantially enhanced. The use of fast moving chains, transversely extending chain driven rollers and guiding cams for the chains is completely eliminated, and the speed at which the finishing cylinder may be rotated and the rate of bag production can be increased without danger of early mechanical failure or serious and costly damage to the bag forming machine as a result of any mechanical failure which may occur. The compact construction of the trailing flap folding mechanism of the invention permits it to be completely enclosed in a relatively small housing so that the safety with which the apparatus may be operated is further increased.

In accordance with the foregoing description and discussion, it is a major object of the present invention to provide an improved bag forming machine of the type used for making satchel bottom bags and self-opening square bottom bags from paper, thermoplastic and the like.

A more specific object of the present invention is to provide an improved mechanism for folding the trailing flap, which forms a portion of the bottom of satchel and square bottom bags, to the desired position preparatory to folding the leading flap of the bottom into superimposed position thereover.

Another object of the present invention is to provide a rear flap folding mechanism for use in paper bag forming machines, which rear flap folding mechanism is dynamically balanced, and can be operated at relatively high speeds without serious danger of malfunctioning.

An additional object of the present invention is to provide a trailing flap folding mechanism of the type used in bag forming machines employing a finishing cylinder rotated at high speeds, which trailing flap folding mechanism is relatively safer in its operation than the types of trailing flap folding mechanism heretofore in use, and particularly, flap folding mechanisms of the chain driven type.

An additional object of the present invention is to provide a trailing flap folding mechanism for use in bag forming machines of the type used to make satchel and square bottom grocery and shopping bags, which trailing flap folding mechanism is compact and requires little space for its operation.

In addition to the foregoing described objects and advantages of the invention, other objects and advantages will become apparent as the following detailed description of the invention is read in conjunction with the accompanying drawings which illustrate my invention.

Figure 1:
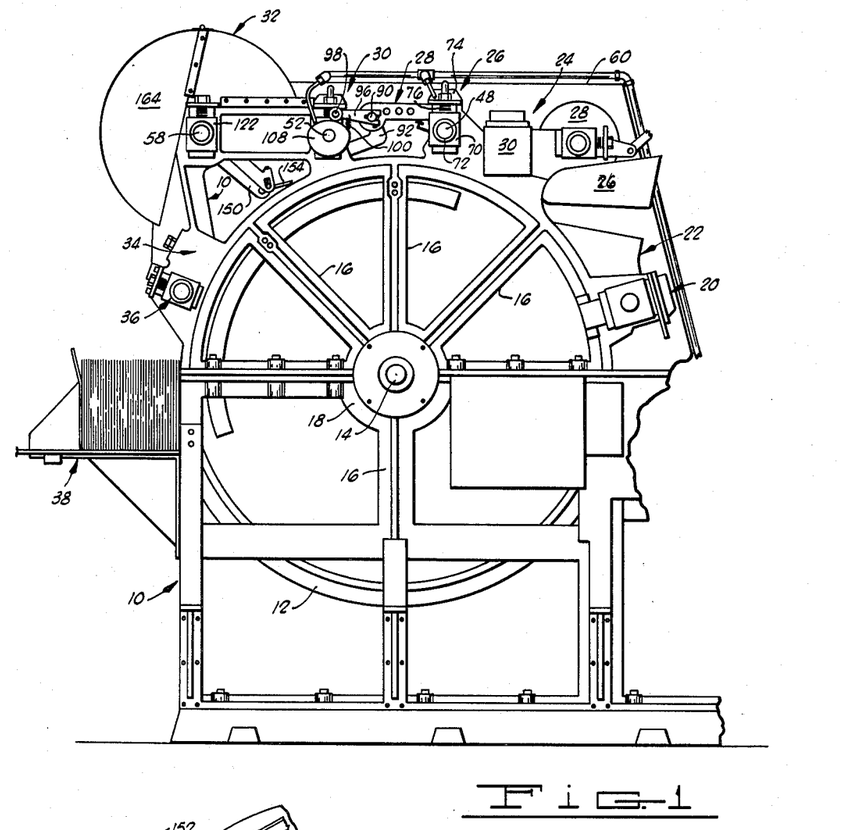
FIGURE 1 is an elevational view illustrating a finishing cylinder used in a bag forming machine, along with certain associated elements for completing or finishing the bag formation, including the rear flap folding mechanism of the present invention.

Referring now to the drawings in detail, and particularly at the outset, to FIGURE 1, reference character 10 designates generally a framework which is used to support a finishing cylinder 12. The finishing cylinder 12 is rotatably supported in the frame 10 by a shaft 14 which is journalled in the frame. The finishing cylinder 12 is reinforced and braced by a plurality of radial spokes extending from a hub 18. The cylinder may be said to constitute the final major subassembly of a complete bag forming machine, the remainder of which is not illustrated in FIGURE 1.

The remainder of the entire bag forming machine which is widely used in conjunction with finishing cylinders of the type illustrated in FIGURE 1 includes mechanism for forming paper stock into gusseted tubes, slitting apparatus for slitting the gusseted tubes at appropriate locations preparatory to forming the bottom thereof, lip cutting elements for cutting a lip at the mouth of the bag to permit one side of the finished bag to be gripped for self-opening, scoring, perforating and/or severing rolls for serving the continuous tube of paper at appropriate intervals corresponding in length to the individual bags to be formed, and any one of several other subassemblies optionally used preparatory to feeding the partially formed bags to a finishing cylinder of the general type illustrated in FIGURE 1.

As the finishing cylinder 12 rotates on the shaft 14, a plurality of partially finished bags are sequentially and in succession conveyed to the outer periphery of the cylinder 12 and are placed on the periphery of the cylinder in circumferentially spaced relation to each other by mechanism not illustrated in FIGURE 1, but generally well understood in the art. It should be remarked in passing that the partially formed bags which are placed on the periphery of the cylinder 12 are in the shape of flat tubes having a longitudinal pasted seam extending the length thereof and having gusset folds formed in each side thereof. The leading ends of the partially formed bags as they are fed to the cylinder 12 are that portion of the tubes which will be formed upon the finishing cylinder 12 into the closed bottoms of the bags in a manner hereinafter more fully described.

Positioned adjacent the outer periphery of the cylinder 12 and circumferentially spaced from each other around said periphery are a plurality of mechanisms which act upon the partially formed bags carried on the periphery of the cylinder as the cylinder rotates the bags past the mechanisms. In the order in which the mechanisms are encountered by the bags on the rotating finishing cylinder the mechanisms are, an opening roll mechanism designated by reference character 20, a folding shoe mechanism 22, an adhesive or paste applying mechanism designated generally by reference character 24, a first tucker mechanism 26, a stretch finger assembly 28, a second tucker mechanism 30, the trailing flap folding mechanism of the present invention 32, a leading flap folding assembly 34 and a press roll assembly 36. An end stacker assembly for receiving the finished bags and accumulating them in an orderly stack is designated by reference character 38.

Figure 11:
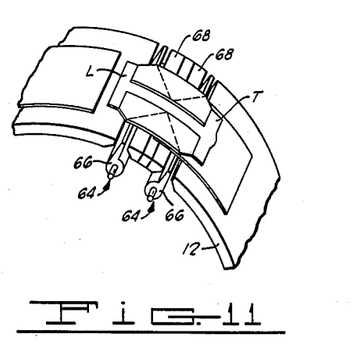
FIGURES 11 through 14 are schematic perspective views illustrating the sequence of actions performed on the bag blanks during formation of the bottom of each bag by the bag forming machine illustrated in FIGURE 1, and including the back flap folding mechanism of the present invention.

Before proceeding to a more detailed description of various mechanisms and subassemblies of the apparatus illustrated in FIGURE 1, and particularly of the rear flap folding improvement of the present invention, it is believed that the reader's understanding of the present invention, and its manner of functioning in the combination in which it is utilized, can be better appreciated by generally describing the operations performed upon the partially finished bags by the apparatus illustrated in FIGURE 1. The finishing cylinder 12 rotates in a counterclockwise direction as it is viewed in FIGURE 1. The partially formed bags in the form of open ended, gusseted tubes are placed on the periphery of the finishing cylinder 12 with the ends of the tubes which are to be formed into the bottoms thereof constituting the leading end of the tube. As the flattened tubes pass the opening roll mechanism 20, the leading ends of the tubes are opened out by grippers, vacuum heads or other types of suitable opening means well known in the art and constituting no part of the present invention. As the bags are moved farther through their arcuate path by the rotating finishing cylinder 12, certain portions of the open end of the bag are engaged by the folding shoe assembly 22 to fold these parts of the bag downwardly and inwardly so that the end of the bag assumes the configuration illustrated in FIGURE 11. In this configuration, it will be perceived that the bag is characterized in having a leading flap L and a trailing flap T which yet remain to be folded together in order to complete the formation of the bottom of the bag.

Each bag is next carried by the rotating finishing cylinder 12 to the locus of the paste applying mechanism 24. This mechanism generally includes a paste pot 26, a paste roll 28 and a paste sector assembly 30. The operation of these elements to apply paste to the partially formed bottoms of the bags is well understood in the art and will not be described in further detail. It should be noted, however, that the pattern of paste applied to the bottom portion of the bag is such that the leading flap L carries paste whereas the trailing flap T does not.

As the finishing cylinder 12 continues to rotate, each bag is next carried under a first tucker mechanism 26 which functions to tuck or push the thicknesses of the bag into clamping elements, later described, carried by the finishing cylinder 1 so that the bag is gripped by such clamping elements along a transverse fold line which extends substantially parallel to the rotational axis of the finishing cylinder. The effect of the cooperative action of the first tucker mechanism 26 and the clamping elements carried by the finishing cylinder 12 is to cause the trailing flap T to stand outwardly from the periphery of the finishing cylinder in a manner and for a purpose hereinafter described in greater detail.

Further rotation of the finishing cylinder 12 brings the leading end of each partially formed bag beneath the second tucker mechanism 30. The second tucker mechanism 30 functions very similarly to the first tucker mechanism 26 and functions to depress the sides and plies of the bag into other clamping elements carried by the finishing cylinder 12 so that the bag is clamped along a transverse fold line extending parallel to, and spaced from, the first fold line formed by the cooperative action of the first tucker mechanism 26 and the first-mentioned clamping elements, and also extending parallel to the rotational axis of the finishing cylinder 12. The effect of the cooperative action of the second tucker mechanism and its cooperating clamping elements is to cause the leading flap of the partially finished bags to stand outwardly from the periphery of the finishing cylinder in a manner and for a purpose which is also discussed at greater length hereinafter.

The next operation which is performed upon each bag as it travels in a circular path upon the periphery of the rotating finishing cylinder 12 is the folding downwardly of the trailing flap T to a flat position adjacent the periphery of the cylinder. The folding of the trailing flap T is accomplished with the novel trailing flap folding mechanism 32, and this operation is described in greater detail in the following portion of the specification.

The leading flap L of each of the bags is next folded downwardly by the stationary leading flap folding assembly 34 after the trailing flap T has been folded by the trailing flap folding mechanism 32. Final pressing of the flaps in their down folded positions, and bonding of the leading flap L to the trailing flap T through the adhesive coating is accomplished by the press roll assembly 36. This assembly includes a roller 37 which extends parallel to the axis of rotation of the finishing cylinder 12 and has its periphery positioned in abutting relation to the finishing cylinder so that bags passed between the roller and the finishing cylinder 12 are pressed, and the bottom flaps are sealed by such pressing action. After passing the press roll assembly 36, the finished bags are deposited in the end stacker assembly 38 in a neat, orderly stack, and they may then be removed from this assembly by any suitable method.

Figure 2:
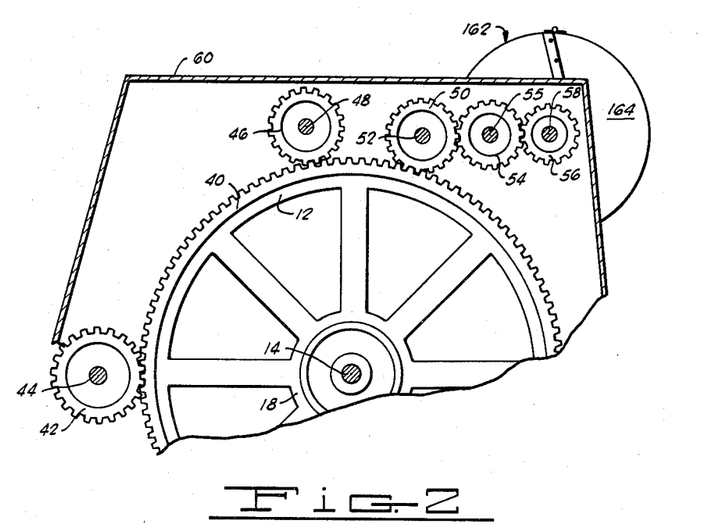
FIGURE 2 is an elevational view with a part of the housing for the drive mechanism of the bag forming machine illustrated in section in order to illustrate a portion of the driving mechanism employed for driving the various bag forming elements illustrated in FIGURE 1.

The gear train which is used to drive the first and second tucker mechanisms 26 and 30, respectively, and the trailing flap folding mechanism 32 of the present invention is illustrated in FIGURE 2. A bull gear 40 is carried on one edge of the outer periphery of the finishing cylinder 12, and is driven by a suitable driving gear 42 mounted on a shaft 44 which is driven from a prime mover (not shown). The bull gear 40 drives a gear 46 keyed to a shaft 48 which extends parallel to the rotational axis of the finishing cylinder and carries the rotating elements of the first tucker mechanism 26. A gear 50 of substantially identical size to the gear 46 is also driven by the bull gear 40 and is keyed to a shaft 52 carrying the rotating elements of the second tucker mechanism 30. An intermediate or idler gear 54 mounted on a stub shaft 55 transmits the rotational movement of the gear 50 to a gear 56 which is keyed to a shaft 58 carrying certain hereinafter described rotating elements of the trailing flap folding mechanism 32 of the present invention. All of the gearing illustrated in FIGURE 2 is enclosed in a suitable housing 60 and is disposed on the opposite side of the finishing cylinder 12 and framework 10 from that which is visible in FIGURE 1.

In order to further facilitate the understanding of the invention, the first and second tucker mechanisms 26 and 30, respectively, the stretch finger assembly 28, and the clamping means carried by the finishing cylinder and with which the tucker mechanisms cooperate will next be described in greater detail. These structures may best be understood by referring to FIGURES 1, 3 and 4.

Figure 3:
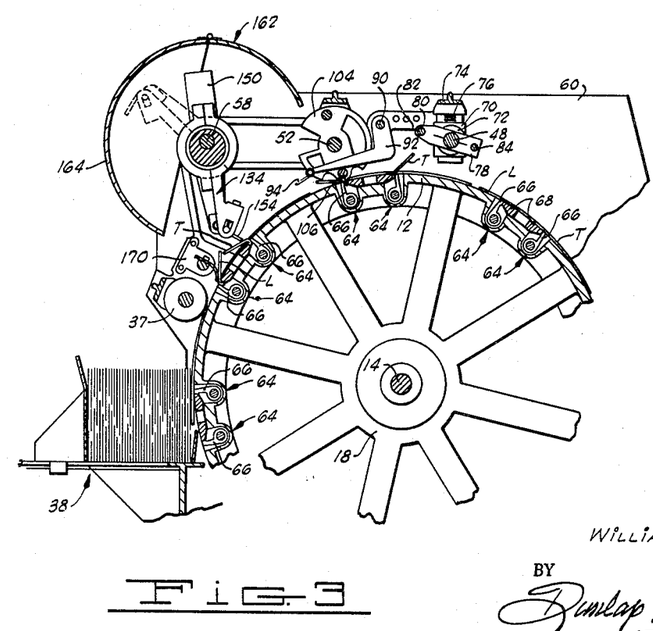
FIGURE 3 is an elevational view similar to FIGURE 1 with certain parts removed and sectional in order to better illustrate certain of the flap forming mechanisms used in the bag forming machine.
Figure 4:
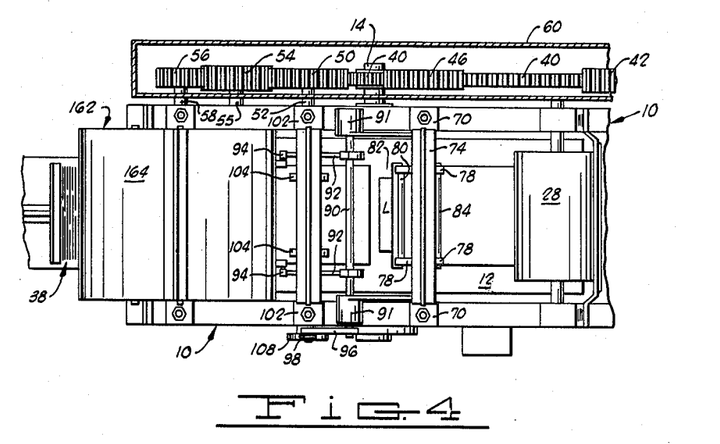
FIGURE 4 is a plan view of the machine illustrated in FIGURE 1.
Figure 5:
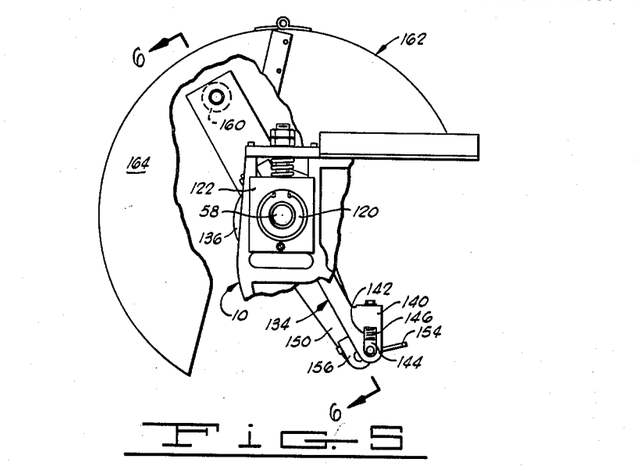
FIGURE 5 is an elevational view of the rear flap folding mechanism of the present invention showing a portion of the housing for said mechanism broken away to permit the moving parts of said mechanism to be viewed.
Figure 6:
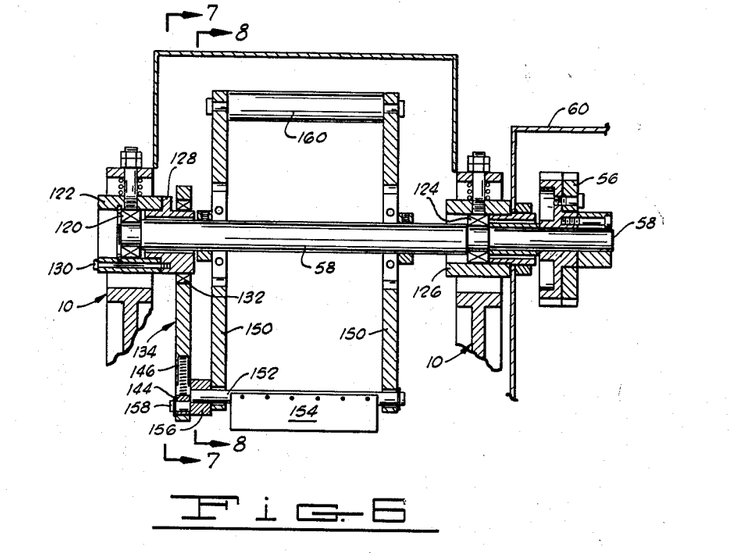
FIGURE 6 is a sectional view taken along line 6—6 of FIGURE 5, but showing the rear flap folding mechanism elements as they appear when the flap folding mechanism shaft has been rotated approximately 30° further in a clockwise direction from the position illustrated in FIGURE 5.

A series of pairs of clamping elements 64 are illustrated in FIGURE 3. The number of pairs of the clamping elements 64 which is employed on the finishing cylinder 12 will depend, in each instance, upon the number of bags which are to be placed upon the periphery of the cylinder. In the embodiment of the invention illustrated by the drawings of this application, eight pairs of clamping elements 64 are positioned in circumferentially spaced relation around the periphery of the cylinder. In other words, the cylinder is constructed with eight receiving stations to accommodate eight partially finished bags on its periphery. Cylinders having seven, nine, ten or twelve stations are also in current use, and their construction is well understood in the art.

Each of the clamping elements 64 includes a spring-biased, pivotally mounted movable clamp 66 and a fixed anvil 68 against which the movable clamp 66 is biased by its spring. It will thus be noted that the movable clamp 66 may be wedged or pressed apart from the anvil 68 so as to permit portions of the bag to be pressed between the movable clamp and the anvil in a manner hereinbefore suggested and hereinafter described in greater detail. For releasing the bags from the clamping elements 64, a cam actuator (not shown) is associated with the finishing cylinder and cooperates with portions of the clamping elements 64 to retract or open the respective movable clamp 66 against the biasing influence of its spring. The opening of the movable clamps 66 to release the bags held thereby is accomplished toward the end of the finishing operation as hereinafter more specifically described.

The structural details and specific arrangements of the movable clamps 66, anvils 68 and the cam elements used to open the clamps for release of bags clamped therein are well understood in the art and may take a variety of forms, any of which may be used in the present invention, provided the basic type of actuation described, and depicted generally in FIGURE 3 is employed. Reference may be had to the hereinbefore cited patents for a more detailed explanation of the type of clamping mechanisms which are conventionally employed with rotating finishing cylinders.

The first tucker mechanism 26, as has previously been indicated, includes the rotatably mounted shaft 48 and the gear 46 keyed to such shaft for driving it in rotation. Additionally, the first tucker mechanism 26 includes a pair of bearing boxes 70 mounted on the framework 10 and rotatably supporting the shaft 52 in suitable bearing elements 72, a rigid bridge 74 interconnecting the bearing blocks 70 and resiliently supported thereon by springs 76, and a pair of tucker arms 78 keyed to the shaft 48 for rotation therewith and spaced axially therealong from each other. A tucker blade bar 80 extends between and is secured to the radially outer ends of the tucker arms 78. An elongated, radially extending tucker blade 82 is secured along one of its longitudinal edges to the tucker blade bar 80.

The stretch finger assembly 28 comprises a shaft 90 which is rotatably journaled in bearing blocks 91 carried by the frame 10 and which has keyed thereto for pivotation therewith a pair of crank shaped stretch finger arms 92 which are spaced from each other along the shaft 90. The stretch finger arms 92 are generally right angular in configuration having a leg which extends from the shaft 90 toward the periphery of the finishing cylinder 12, and a leg which extends generally parallel to a tangent of the finishing cylinder. At its free end, each stretch finger arm 92 carries a spring metal stretch finger 94 which is adapted to bear resiliently against the periphery of the finishing cylinder 12 as hereinafter described.

The end of the shaft 90 which is closest adjacent the side of the bag forming machine illustrated in FIGURE 1 carries a spring arm 96 which rotatably journals a freely rotating cam follower roll 98 at its free end for following the surface of a cam carried by the second tucker mechanism 30 in a manner hereinafter described. A suitable spring 100 is connected between the frame 10 and the spring arm 96 to bias the cam follower roll 98 into contact with its associated cam during the operation of the bag forming machine.

The second tucker mechanism 30 includes, in addition to the rotatably mounted shaft 52 and the driving gear 50 which is keyed thereto, a pair of bearing boxes 102 mounted on the frame 10 and journaling the shaft 52 at points adjacent to, put spaced slightly inwardly from, the opposite ends thereof. The shaft 52 has keyed thereto intermediate its length, and between the bearing boxes 102, a pair of axially spaced tucker blade mounting discs 104. A tucker blade 106 extends between the tucker blade mounting discs 104 and is received in a slot in the periphery of each of the discs so as to project radially outwardly from the periphery of the discs and extend parallel to the rotational axis of the finishing cylinder 12. At its end corresponding to the end of the shaft 90 which carries the spring arm 96, the shaft 52 carries a cam plate 108 which is keyed to the shaft 52 for rotation therewith. The shape of the cam plate 108 can best be perceived in FIGURE 1 of the drawings, and it will be noted that it has a flattened lobe surface extending over an arc of about 180° of its rotation. The cam follower roll 98 rides upon, and follows the curvature of, the cam plate 108.

*Operation of first and second tucker mechanisms and stretch finger assembly*

As previously explained, in the operation of the bag forming machine under consideration, a plurality of partially formed bags are placed in a flattened status on the periphery of the finishing cylinder 12 in circumferentially spaced relation to each other therearound. The number of the bags placed on the cylinder corresponds to the number of stations thereon for receiving the bags, which in turn corresponds to the number of pairs of clamping elements 64 which are positioned around the periphery of the cylinder. In the embodiment of bag forming machine illustrated, eight such stations are provided and there are therefore eight pairs of clamping elements 64 around the periphery of the cylinder. The bags are fed to the finishing cylinder 12 in a way such that each bag overlies one pair of clamping elements 64 with the leading flap L extending forwardly of the leading movable clamp 66 and the trailing flap T extending to the rear of the trailing movable clamp 66. This relationship is illustrated most clearly in FIGURES 3 and 11 of the drawings.

Figure 12:
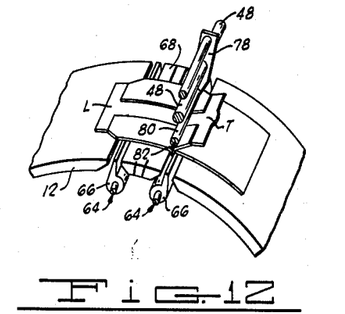

As the finishing cylinder 12 continues to rotate, each bag on the periphery thereof is brought beneath the first tucker mechanism 26. The drive synchronism between the finishing cylinder 12 and the shaft 48 of the first tucker mechanism is such that the tucker blade 82 is rotated into engagement with the trailing clamping element 64 as each pair of clamping elements passes thereunder. The speed of rotation of the tucker blade 82 must thus be equivalent to the speed of rotation of the finishing cylinder 12 multiplied by the number of stations on the periphery thereof in order for the blade to make contact with each trailing clamping element 64 of each of the pairs of clamping elements. As the tucker blade 82 of the first tucker mechanism 26 is rotated into cooperating relation with the movable clamp 66 of the trailing clamping element 64 of each pair of clamping elements, it wedges the spring-biased clamp 66 apart from its associated anvil 68 and simultaneously biases or depresses the flattened bag into the space between the movable clamp 66 and its associated anvil 68. Continued rotation of the shaft 48 of the first tucker mechanism 26 and the finishing cylinder 12 causes the tucker blade 82 to move away from the periphery of the finishing cylinder and disengage the movable clamp 66 so that it can snap back against the anvil 68 under the biasing influence of its spring. This clamps the bag along a fold line which will become the side edge of the trailing flap, and which will define the line along which the trailing flap T is subsequently folded by the trailing flap folding mechanism as hereinafter described. The effect or result of this clamping of the bag along the described fold line is to cause the trailing flap T to stand outwardly from the periphery of the cylinder 12 in the manner illustrated most clearly in FIGURES 3 and 12 of the drawings.

Figure 13:
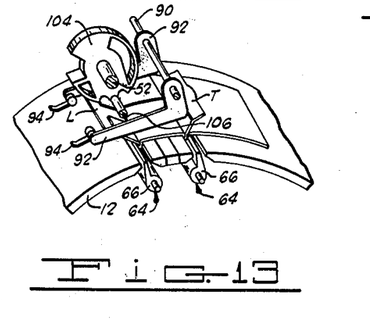

As the finishing cylinder 12 continues to rotate, the second tucker mechanism 30 is driven in synchronism with the finishing cylinder so that the tucker blade 106 of the second tucker mechanism is timed to engage each of the leading clamping elements 64 as it passes beneath the shaft 52 of the second tucker mechanism. The coaction between the tucker blade 106 of the second tucker mechanism 30 and the movable clamp 66 of the leading clamping element 64 is substantially the same as that which has been described as characteristic of the tucker blade 82 of the first tucker mechanism 26. Thus, the movable clamp of the leading clamping element 64 in each pair of clamping elements is wedged away from its cooperating anvil 68, and simultaneously, the bag is depressed along a fold line into the gap formed between the movable clamp 66 and its anvil 68. Continued rotation of the shaft 52 and the finishing cylinder 12 disengages the tucker blade 106 from the leading clamping element 64 so that the movable clamp 66 thereof may snap against and hold the bag along a leading fold line about which the leading flap L is to be folded. The leading flap L is caused by this action to stand outwardly and away from the periphery of the finishing cylinder 12 as illustrated in FIGURE 13.

As the finishing cylinder 12 then continues to rotate, the leading and trailing flaps L and T are moved away from the second tucker mechanism 30 toward the rear flap folding mechanism 32, and the body of the partially formed bag which trails these bottom flaps thereof is engaged and pressed against the periphery of the cylinder 12 by the spring metal stretch fingers 94. In order to prevent the spring metal stretch fingers 94 from interfering with the clamping of the bag along the appropriate fold line by the leading clamping element 64 in each pair of clamps, the stretch fingers 94 and stretch finger arms 92 are pivoted upwardly from the periphery of the drum by the action of the cam plate 108 at the time when the tucker blade 106 of the second tucker mechanism 30 is cooperating with its respective clamping element 64. In other words, as the shaft 52 of the second tucker mechanism 30 rotates, the cam plate 108 is also rotated and at the time that the tucker blade 106 approaches the periphery of the cylinder 12, the high portion of the cam plate pivots the spring arm 96 upwardly, and with it, the stretch finger arms 92. The stretch finger arms 92 and stretch fingers 94 are thus enabled to clear the upstanding leading and trailing flaps L and T, respectively, as they pass beneath the stretch fingers. Immediately after these flaps pass beneath the stretch fingers 94, these elements are lowered again to the periphery of the finishing cylinder 12 and bear against the trailing body of the bag to hold the bag in abutting contact with the periphery of the cylinder.

*Structure of the rear flap folding mechanism*

The details of construction of the novel rear flap folding mechanism 32 of the present invention can best be understood by referring to FIGURES 5 through 8 of the drawings. The rear flap folding mechanism 32 includes, as previously indicated, the rotatably mounted shaft 58 and the driving gear 56. The shaft 58 extends parallel to the shaft 14 and rotational axis of the finishing cylinder 12, and is spaced radially outwardly from the periphery of the finishing cylinder. At one of its ends, the shaft 58 is journaled in a bearing 120 mounted in a bearing box 122 which is in turn secured to the frame 10 on the operator's side of the bag forming machine as viewed in FIGURE 1. Adjacent its other end which carries the gear 56, the shaft 58 is journaled in a second bearing 124 which is positioned in a bearing box 126 also carried by the frame 10 (see FIGURE 6). An eccentric bearing cap 128 is bored ⅜ inch off center, is journaled on the shaft 58 and is secured to the bearing box 122 by a suitable bolt 130. A bearing 132 is mounted on the hub of the eccentric bearing cap 128 and rotatably supports a cam arm 134 on the bearing cap. Thus, the cam arm 134 can rotate freely in eccentric rotation about the shaft 58. The eccentricity of the eccentric bearing cap 128 is perhaps best illustrated in FIGURE 7.

The cam arm 134 includes two semicircular hub portions 136 which are bolted together around the bearing 132, a shank portion 138 and a radially outer end portion 140. The radially outer end portion 140 of the cam arm 136 is provided with a slot 142 which extends in a generally radial direction with respect to the shaft 58. A bearing block 144 is slidably positioned in the slot 142 and is resiliently biased toward the radially outer end of the slot by a helical spring 146 which extends between the bearing block 144 and the radially inner end of the slot 142.

Positioned intermediate the length of the shaft 58 and keyed to the shaft for rotation therewith are a pair of axially spaced folding arms 150. The folding arms 150 are keyed to the shaft 58 intermediate their length so that they extend substantially parallel to each other and so that portions of each of the folding arms extend radially on opposite sides of the shaft 58. At two of their aligned ends, the folding arms 150 rotatably journal a plate supporting shaft 152 which extends between the folding arms. The plate supporting shaft 152 has secured thereto over a major portion of its length between the folding arms 150, an elongated, generally rectangular flap folding plate 154. The flap folding plate 154 is preferably constructed of nylon or other high density synthetic resin or thermoplastic material having a relatively low coefficient of friction and having considerable resilience for a purpose hereinafter described.

Figure 8:
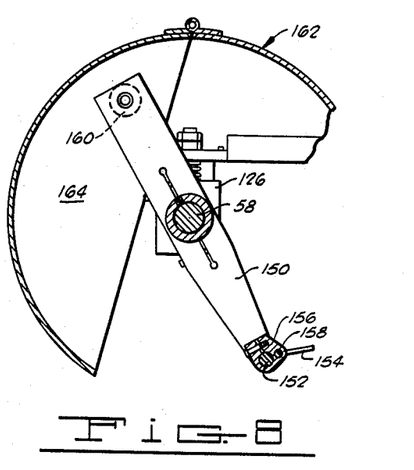
FIGURE 8 is a sectional view taken along line 8—8 of FIGURE 6.

One end of the plate supporting shaft 152 extends through the flap folding arm 150 which is most closely located with respect to the cam arm 134 and is secured to one end portion of a crank arm 156, the configuration of which is most clearly illustrated in FIGURE 8. The other end portion of the crank arm 156 carries a stub shaft 158 which is rotatably journaled in the bearing block 144 slidably mounted in the slot 142 at the radially outer end 140 of the cam arm 134.

As a final element of the moving elements of the rear flap folding mechanism 32, an elongated counterbalance 160 extends between, and is secured to, the ends of the folding arms 150 disposed on the opposite side of the shaft 58 from the ends of these arms which carry the plate supporting shaft 152 and the flap folding plate 154. The counterbalance 160 is, of course, of a size and weight to dynamically balance the plate supporting shaft 152 and flap folding plate 154 during rotation of the folding arms 150 with the shaft 58 in the manner hereinafter described. The moving portions of the trailing flap folding mechanism 32 are inclosed in a generally cylindrical housing 162 which includes a hinged cover portion 164. The cover portion 164 may be pivoted upwardly to an opened position to provide access to the moving portions of the mechanism.

*Operation of the trailing flap folding mechanism*

The trailing flap folding mechanism is driven in synchronism with the finishing cylinder 12 and the tucker mechanisms 26 and 30 hereinbefore described by means of the gear train illustrated in FIGURE 2, and specifically, through gear 56 and the rotatably mounted shaft 58 which is keyed thereto. As the shaft 58 is rotated, the folding arms 150 are rotated with the shaft in concentric rotation about its axis. Rotation of the folding arms 150 also produces rotation about the axis of shaft 58 of the plate supporting shaft 152 and the flap folding plate 154 which are carried at the radially outer ends of the folding arms 150.

Since the folding arms 150 are connected through the plate supporting shaft 152, the crank arm 156 and the bearing block 144 to the cam arm 134, the cam arm is caused to rotate about the axis of the shaft 58 with the folding arms 150. The cam arm 134 is eccentrically mounted on the shaft 58, however, and the radially outer end of the cam arm 134 therefore undergoes a reciprocating motion relative to the radially outer ends of the folding arms 150. The eccentricity of the eccentric bearing cap 128 is such that the radially outer end of the cam arm 134 projects farthest past the radially outer ends of the folding arms 150 when the cam arm and folding arms are at what might be termed the bottom of their stroke, or, stated differently, at a position slightly past their point of closest approach to the periphery of the finishing cylinder 12. This position is illustrated in FIGURE 3 of the drawings. At the other extreme of its eccentric rotational movement, the radially outer end of the cam arm 134 is reciprocated radially inwardly relative to the radially outer ends of the folding arms 150 at a time when these arms are near to the top of their stroke, or in other words, have been rotated approximately 180° from the position illustrated in FIGURE 3 of the drawings.

Figure 7:
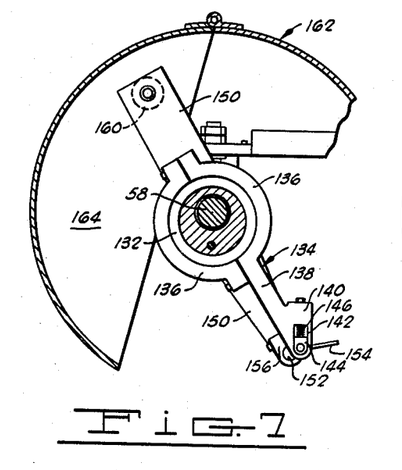
FIGURE 7 is a sectional view taken along line 7—7 of FIGURE 6.

The effect of the eccentric rotation of the cam arm 134 about the shaft 58 is to cause the flap folding plate 154 to undergo an oscillating motion moving it from a first, or flap folding position in which it extends outwardly from the arc of curvature swept out by its pivotal axis on the shaft 152 to a retracted position in which it is retracted toward, or in a preferred embodiment of the invention, inside, this arc of curvature. Stated differently, the flap folding plate 154 is caused to oscillate from a position in which it extends substantially normal to a tangent of the finishing cylinder 12 and away from the figure of revolution swept out by its pivotal axis to a retracted position in which it is moved from the first mentioned position toward its rotational axis in the shaft 58. The extent of retraction of the flap folding plate 154 is sufficient to permit the plate to clear the housing 162 including the pivoted cover 164 when the cover is in its closed position as shown in FIGURES 3, 7 and 8. The oscillatory motion of the flap folding plate 154 is effected by the crank arm 156 which interconnects the cam arm 134 and the plate supporting shaft 152. Thus, the crank arm 156 is caused to pivot or move about the axis of the shaft 152, but since it is keyed thereto, it causes concurrent movement of the shaft 152 and the flap folding plate 154.

The spring 146 mounted in the slot 142 in the outer end of the cam arm 134 performs a dual function. In the first instance, it prevents the flap folding plate 154 from undergoing a complete rotational movement about its pivotal axis in the plate supporting shaft 152 at the top of the stroke of the folding arms 150 as the folding plate 154 would be otherwise inclined to do under gravitational influence. In other words, it preserves a pure oscillating movement in the flap folding plate 154 as opposed to a rotational movement through 360°. A more important function of the spring 146, however, is to permit the flap folding plate 154 to yield upon contact with the peripheral surface of the finishing cylinder 12, or any other obstruction which it might encounter during its rotation about the axis of shaft 58, such as, for example, the fingers or hands of operators, or any portion of the housing 162 which might inadvertently become bent inwardly. Thus, if the flap folding plate 154 is struck in a direction tending to pivot it in a counterclockwise direction as viewed in FIGURES 5, 7 and 8, the result will be that the bearing block 144 will be forced upwardly in the slot 142 against the resilient biasing influence of the spring 146. As soon as the obstruction has been cleared, however, the spring 146 will force the bearing block 144 to return to the bottom of the slot 142 and will thus restore the flap folding plate 154 to its normal position for undergoing the desired oscillatory motion.

It should be pointed out at this point that the throw of the flap folding plate 154 in its oscillatory motion may be varied in accordance with varying circumstances and types of flap folding operations which are being undertaken. In a preferred embodiment of the invention, it is preferred that the size of the flap folding plate 154 be such that it lightly touches or engages the peripheral surface of the finishing cylinder 12 when it is in the position illustrated in FIGURE 1 so that assurance may be gained that the trailing flap T will be contacted near its base and folded completely over in the manner illustrated in FIGURE 3 and as hereinafter described in greater detail. It is also a matter of choice as to how far the flap folding plate 154 shall be retracted during the retracting portion of its oscillatory movement. In general, however, retraction to a position in which the plate 154 lies entirely within the figure of revolution swept out by the plate supporting shaft 152 will accomplish the purpose of avoiding any obstruction which might otherwise interfere with the proper functioning of the flap folding mechanism. It will have become apparent at this point that the oscillatory movement which is imparted to the flap folding plate 154 permits the trailing flap folding mechanism 32 to be much more compactly constructed than would otherwise be possible, and this motion of the flap folding plate 154 is also highly desirable from the standpoint of its action upon the trailing flap as hereinafter described.

After the partially formed bags carried on the periphery of the finishing cylinder 12 have passed the first and second tucker mechanisms 26 and 30, respectively, they are clamped along fold lines at the base of the leading flap L and trailing flap T by the clamping elements 64, and the leading and trailing flaps extend outwardly from the periphery of the cylinder 12 in the manner illustrated in FIGURE 13. With the flaps in this outwardly extending position, the bags continue to be carried toward the rear flap folding mechanism 32 by the finishing cylinder 12. The shaft 58 of the rear flap folding mechanism 32 is driven in synchronism with the finishing cylinder so that the radially outer ends of the folding arms 150 and cam arm 134 approach the outer periphery of the finishing cylinder as the bags with leading and trailing flaps, L and T, respectively, are brought beneath the rear flap folding mechanism. The flap folding plate 154 is, at this time, oscillating toward the periphery of the finishing cylinder 12 and its movement is timed to permit it to sweep in behind and overtake the trailing flap T in a manner most clearly illustrated in FIGURE 3. The greater lineal speed of the flap folding plate 154 than the bags carried on the peripheral surface of the finishing cylinder 12 permits the flap folding plate 154 to strike through an arc which passes through the trailing flap T so that the trailing flap is biased downwardly and forwardly to a flattened position closely adjacent the periphery of the finishing cylinder 12. After completing the folding of the trailing flap T in this manner, the folding arms 150 and cam arm 134 of the rear flap folding mechanism 32 continue to rotate, and, as previously explained, the eccentricity of the cam arm 134 produces a reversal in the oscillatory motion of the flap folding plate 154 so that it is retracted away from the periphery of the finishing cylinder 12 and toward the figure of revolution swept out by its pivotal axis. The retraction of the flap folding plate 154 in this manner permits it to clear the housing 162 which encloses the moving elements of the flap folding mechanism, and the flap folding plate 154 remains in this retracted position until it again commences to approach the periphery of the finishing cylinder after rotating through slightly more than 180°.

*Structure and operation of the stationary leading flap folding assembly*

Figure 9:
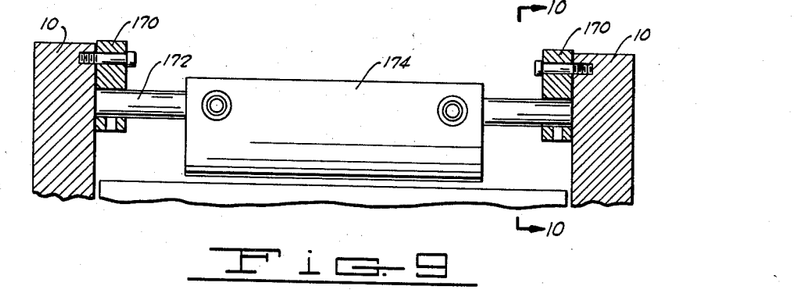
FIGURE 9 is an elevational view of the stationary front flap folding assembly used in the bag forming machine of FIGURE 1, but showing the supporting blocks for the assembly in section.
Figure 10:
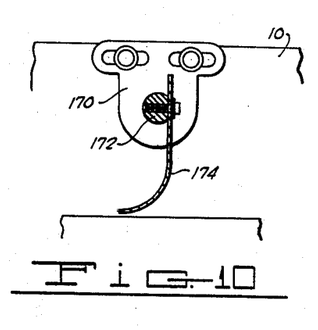
FIGURE 10 is a sectional view taken along line 10—10 of FIGURE 9.

The construction of the leading flap folding assembly 34 is relatively simple and is illustrated in FIGURES 9 and 10 of the drawings. This assembly is stationary and contains no moving parts. The assembly comprises a pair of supporting blocks 170 which are bolted to the frame 10 and carry a shaft 172 which extends between them in the manner illustrated in FIGURE 9. Secured to the shaft 172 intermediate its length is a curved flap folding plate 174, the cross-sectional configuration of which is illustrated in FIGURE 10. As will be noted in referring to FIGURE 3, the curved flap folding plate 174 extends into close proximity to the periphery of the finishing cylinder 12 and is curved in the direction of rotation of the finishing cylinder so that the leading flap L of the partially formed bags, in passing under the curved folding plate 174, will be biased downwardly to a flattened position overlying the trailing flap T which has previously been folded downwardly by the trailing flap folding mechanism 32. In summary, then, the folding of the leading flap L occurs immediately after the trailing flap T has been folded downwardly and is accomplished by the continued movement of the peripheral surface of the finishing cylinder 12 beneath the curved folding plate 174 of the leading flap folding assembly 34. It is to be noted that although one embodiment of the leading flap folding assembly 34 has been illustrated and described in this application, others of different configuration and construction can be also employed, and the particular construction of this element is not critical, provided that it effects a rearward and downward folding of the leading flap at a point in time after the trailing flap has been pressed into its down folded position by the action of the trailing flap folding mechanism 32.

The final step in completion of the bags carried by the finishing cylinder 12 is their passage between the roll 37 of the press roll assembly 36 and the periphery of the finishing cylinder 12 to bond the overlying flaps to each other through the adhesive applied thereto, and thus to seal the bottom of the bag. The finished bags are then collected in the end stacker assembly 38.

*Summary of operation*

Having described in considerable detail the various elements which are used in combination with the improved rear flap folding mechanism 32 of the present invention, and the specific and detailed operation of the rear flap folding mechanism per se, it is believed that a complete and full understanding of the invention can now be assured by a brief summary of the complete operation of the bag manufacturing operation.

Partially formed bags in the form of gusseted tubes sealed along a longitudinal line extending their length are fed to the finishing cylinder 12 by a mechanism not shown in the accompanying drawings and forming no part of the present invention. The bags are placed by appropriate mechanism on the periphery of the finishing cylinder in circumferentially spaced relation to each other therearound with one of the partially finished bags overlying each of the pairs of clamping elements 64. After each bag has had its leading end (relative to the direction of rotation of the finishing cylinder 12) opened out and the sides thereof folded inwardly to commence the formation of the bottom, paste is applied at appropriate locations on the trailing and/or leading flaps of the bottoms of the partially formed bags and each bag is then passed beneath the first tucker mechanism 26. Here, the tucker blade 82 carried by this tucker mechanism engages and coacts with the trailing clamping element 64 of each of the pairs of clamping elements to depress the bag between the movable clamp 66 and its associated anvil 68 and to thus form a fold line about which the trailing flap T of each bag can be folded. This action of the first tucker mechanism 26 cooperatively with the associated clamping element 64 causes the trailing flap T to stand outwardly from the periphery of the finishing cylinder 12 in the manner illustrated in FIGURES 3 and 12.

Continued rotation of the finishing cylinder 12 brings the partially formed bag beneath the second tucker mechanism 30 which creases the bag along a second fold line by depressing it into the leading clamping element 64. This action causes the leading flap L to stand outwardly from the periphery of the finishing cylinder 12 and the appearance of the partially formed bag at this point is illustrated in FIGURE 13 of the drawings.

Figure 14:
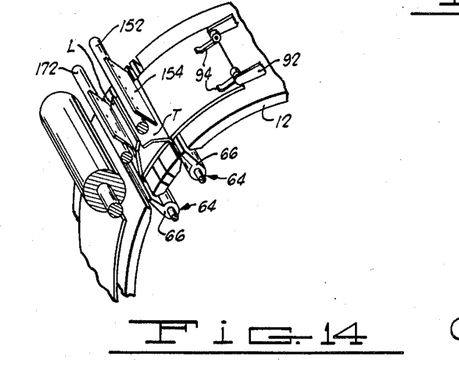

As the finishing cylinder 12 continues to rotate, the trailing flap T is overtaken by the oscillating flap folding plate 154 of the rear flap folding mechanism 32 and is folded thereby in a forward and downward direction to the position best illustrated in FIGURES 3 and 14 of the drawings.

The leading flap folding assembly 34 is next engaged by the leading flap L of the bag, and this flap is biased by the curved folding plate 174 downwardly into superimposed relation over the trailing flap T. The commencement of this action is illustrated in FIGURES 3 and 14. The bag then passes under the press roll 34 and the flaps are sealed to each other by means of the adhesive which has been previously applied to the flaps. The finished bags are collected in the end stacker assembly 38 in a neat orderly stack and may be removed therefrom by any suitable means.

From the foregoing description of the invention, it is believed that it will have become apparent that the present invention constitutes a significant improvement in the types of machines presently in use for producing self-opening square bottom bags as well as satchel bottom bags constructed of paper, synthetic resins or the like. The novel rear flap folding mechanism which is provided is compact in construction, is dynamically balanced and mechanically sturdy, and has been found to be very reliable in operation, reducing the number of reject bags which are produced as a result of improper flap folding operations, and reducing the danger which has previously characterized chain driven flap folding mechanisms.

Although a preferred embodiment of the invention has been illustrated in this application in order to provide a clear indication to those skilled in the art of the manner in which the invention is to be practiced, it will be readily appreciated that a number of variations in the precise structure depicted and described may be effected without departing from the basic principles upon which the invention is bottomed. Insofar, therefore, as innovations and modifications may be made in the exemplary structure hereinbefore described and depicted in the drawings, it is intended that all such modifications and innovations be circumscribed and encompassed by the spirit and scope of this invention except as the same shall involve a departure from the basic principles underlying the invention, or a judicial determination that such innovations and modifications fall outside a reasonable range of equivalents assigned to the appended claims.

I claim:

1. In a bag making machine of the type having a rotating finishing cylinder and means for clamping partially formed bags to the periphery of the finishing cylinder with leading and trailing bottom forming flaps extending away from the periphery of the cylinder, the improvement comprising:
a shaft extending substantially parallel to the axis of rotation of the finishing cylinder and spaced radially outwardly from the periphery thereof;
means for driving said shaft in rotation;
a first arm keyed to said shaft for rotation therewith and extending radially from said shaft, said arm having a radially outer end;
a flap contacting element pivotally connected to said arm at a point spaced along said arm from said shaft by a distance less than the distance from said shaft to the periphery of said forming drum, the pivotal axis of said flap contacting element extending substantially normal to said arm and substantially parallel to the axis of rotation of said finishing cylinder; and
means for oscillating said flap contacting element about its pivotal axis between a flap folding position adjacent said finishing cylinder in which said flap contacting element extends radially toward said finishing cylinder from its pivotal axis, and a retracted position in which said flap contacting element is retracted within the figure of revolution described by the radially outer end of said arm during the rotation of said shaft and arm,
said shaft being positioned relative to the periphery of said finishing cylinder to bring said flap contacting element into contact with the trailing bottom forming flaps of said partially formed bags during rotation of said finishing cylinder and concurrent rotation of said shaft.

2. The improvement claimed in claim 1 wherein said means for oscillating said flap contacting element comprises:
a cam arm mounted on said shaft for free eccentric rotation thereabout and having a radially outer end; and
a crank arm connected to said cam arm at a point spaced radially outwardly from said shaft and connected to said flap contacting element,
the eccentricity of said cam arm relative to the axis of said shaft, and the configuration of said crank arm being such that said flap contacting element is oscillated on its pivotal axis from a position in which it extends from its pivotal axis radially toward, and into contact, with said finishing drum, to a position in which said flap contacting element is retracted within the arc of rotation of its pivotal axis.

3. The improvement claimed in claim 1 wherein said means for driving said shaft in rotation comprises:
gearing means connected to said shaft and adapted for connection to said finishing cylinder for driving said shaft and finishing cylinder in synchronous rotation in opposite directions with said shaft rotating sufficiently faster than said finishing cylinder to cause said flap contacting element to overtake partially formed bags carried on the periphery of said finishing cylinder.

4. The improvement claimed in claim 2 wherein said flap contacting element comprises:
a support shaft pivotally journaled in said first arm and connected at one of its ends to said crank arm; and
an elongated, synthetic thermoplastic plate having one of its longitudinal edges secured to said support shaft along a portion of the length thereof.

5. The improvement claimed in claim 2 wherein the eccentricity of said cam arm relative to the axis of said shaft is such that the axis of concentric rotation of said cam arm is displaced from the axis of said shaft in the direction of said finishing cylinder from said shaft.

6. The improvement claimed in claim 2 wherein said cam arm is slotted over a portion of its length adjacent the radially outer end thereof, and the improvement is further characterized to include
a bearing block slidably mounted in said slot and journaling one end of said crank arm; and
a resilient element mounted in said slot and extending between said bearing block and the radially inner end of said slot for undergoing resilient deformation in compression upon sliding movement of said bearing block in said slot radially inwardly along said cam arm toward the rotational axis thereof whereby said flap contacting element may pivotally yield upon contact with said finishing cylinder.

7. Apparatus for making gusseted bags having flaps folded over each other and adhered together to form the bottom of said bags, said apparatus comprising:

a finishing cylinder;

means for driving said finishing cylinder in rotation about the axis thereof;

clamp means carried by said finishing cylinder adjacent the outer periphery thereof for holding partially formed bags flat against the outer periphery of said finishing cylinder with a leading and trailing bottom forming flap of each of said bags extending outwardly therefrom;

tucker means adjacent the periphery of said finishing cylinder and spaced radially outwardly therefrom for tucking said partially formed bags in said clamp means during the rotation of said finishing cylinder;

a trailing flap folding mechanism adjacent the periphery of said finishing cylinder and spaced circumferentially around said finishing cylinder from said tucker means in the direction of rotation of said finishing cylinder, said trailing flap folding mechanism comprising:

a flap contacting element; and means rotatably supporting said flap contacting element for rotation about an axis extending parallel to the rotational axis of said finishing drum, said flap contacting element supporting means including an arm mounted for concentric rotation about the rotational axis of said flap contacting element and pivotally supporting said flap contacting element; and crank means mounted for eccentric rotation about the rotational axis of said flap contacting element and connected to said flap contacting element for pivoting said flap contacting element from a flap folding position in which it extends outside the arc of rotation of its pivotal axis as carried in rotation by said arm to a retracted position within said arc of rotation of the pivotal axis of said flap contacting element; and a leading flap folding mechanism adjacent the periphery of said finishing cylinder and spaced circumferentially around said finishing cylinder from said trailing flap folding mechanism for folding the leading flaps of said partially formed bags down onto the trailing flaps thereof after said trailing flap has been contacted and folded by the flap contacting element of said trailing flap folding mechanism.

8. Apparatus as claimed in claim 7 wherein said crank means comprises:

a cam arm adjacent said first mentioned arm and rotatably supported for free eccentric rotation about the rotational axis of said flap contacting element; and a crank arm interconnecting said cam arm and said flap contacting element for converting the eccentric rotational movement of said cam arm to oscillating movement by said flap contacting element.

9. Apparatus as claimed in claim 7 wherein said tucker means comprises:

a first tucker mechanism; and a second tucker mechanism spaced circumferentially around said finishing cylinder from said first tucker mechanism, each of said tucker mechanisms including a rotating tucker blade mounted for rotation about an axis extending substantially parallel to the axis of rotation of said finishing cylinder and co-operating with said clamp means during the rotation of said tucker blades and finishing cylinder.

10. Apparatus as claimed in claim 8 wherein said flap contacting element comprises:

supporting means pivotally carried by said first mentioned arm; and a flat plate secured along one of its edges to said supporting means and extending away from said supporting means.

11. Apparatus as claimed in claim 10 and further characterized to include a second arm mounted for concentric rotation about the rotational axis of said flap contacting element and spaced along said axis from said first mentioned arm, and wherein said supporting means comprises a shaft spaced radially from the rotational axis of said flap contacting element and rotatably journaled adjacent its opposite ends in said first mentioned arm and said second arm, said shaft extending substantially parallel to the axes of rotation of said flap contacting element and said finishing cylinder.

12. Apparatus as claimed in claim 11 wherein said crank arm is connected to said supporting means shaft, and is connected to said cam arm at a point which moves from a position outside the figure of revolution swept out by the pivotal axis of said flat plate during rotation of said flap contacting element to a position which does not exceed the radial distance from the rotational axis of said flap contacting element to said figure of revolution.

13. Apparatus as claimed in claim 11 wherein said first mentioned arm and said second arm each extend through the rotational axis of said flap contacting element and each terminate in two opposite ends disposed on opposite sides of the rotational axis of said flap contacting element, and said apparatus is further characterized to include counterbalancing means secured to the ends of said first mentioned and second arms which are on the opposite side of the rotational axis of said flap contacting element from the points of securement to said arms of said supporting means shaft, whereby said counterbalancing means counterbalances said supporting means shaft and said flat plate during rotation of said flap folding element.

14. Apparatus as claimed in claim 12 wherein the eccentricity of said cam arm relative to said rotational axis is in the direction of said finishing cylinder whereby the first described position of claim 12 is attained when said flat plate is adjacent said finishing cylinder.

15. Apparatus as claimed in claim 9 and further characterized in including means for synchronously rotating said finishing cylinder, said rotating tucker blades and said flap contacting element to bring said rotating tucker blades into cooperating relation with said clamp means, and to subsequently bring said flap contacting element to its closest position to said finishing cylinder after said clamp means has rotated past said tucker means and at least to a line extended to the periphery of said finishing cylinder from the rotational axis of said flap contacting element and through the pivotal axis of said flap contacting element when said flap contacting element is in its closest position to said finishing cylinder.

16. Apparatus as claimed in claim 8 wherein said cam arm is longitudinally slotted adjacent its end radially spaced from said axis of rotation, and said apparatus is further characterized in including a bearing block slidably mounted in the slot in said cam arm for sliding movement therealong radially toward the axis of rotation of said flap contacting element and journaling one end of said crank arm; and a resilient element mounted in said slot and extending between said bearing block and the radially inner end of said slot for undergoing resilient deformation in compression upon sliding movement of said bearing block in said slot toward the rotational axis of said flap contacting element.

17. Apparatus for superimposing in a flat, folded down position, the trailing flap of a pair of flexible flaps forming a portion of the bottom of a bag of paper or the like, said flaps, prior to folding, extending from spaced parallel fold or crease lines in a common direction away from the remainder of said bag, said apparatus comprising:

rotating means having a radially outer peripheral extremity spaced radially outwardly from the axis of rotation of said rotating means;

an elongated flap folding plate pivotally connected to the radially outer peripheral extremity of said rotating means;

a rotatably mounted cam arm positioned for eccentric, free rotation about the rotational axis of said rotating means and having a radially outer end;

a crank arm having one of its ends connected to said flap folding plate at the pivotal axis thereof and having its other end connected to said cam arm inwardly from the radially outer end thereof for oscillating said flap folding plate through a pivotal arc intersecting and extending on both sides of the circular path swept out by the pivotal axis of said flap folding plate during rotation of said rotating means;

bag conveying and supporting means positioned adjacent said rotating means and having a bag supporting surface extending in close proximity to the radially outer peripheral extremity of said rotating means, and bag clamping means positioned at said surface for clamping a plurality of partially formed bags on said conveying and supporting means in spaced, aligned relation to each other, said clamping means clamping each of said spaced, partially formed bags along parallel fold lines to cause said flaps to extend toward said rotating means in a position for contact by said flap folding plate; and means for synchronously driving said conveying means and said rotating means so that the linear speed of said flap folding plate is faster than the linear speed of said conveying means, and said flap folding plate overtakes, contacts and folds down the trailing flap of each of said bags as said bags are moved by said conveyor means adjacent and past said rotating means.

18. Apparatus as claimed in claim 17 wherein said rotating means comprises:

a rotatably mounted shaft;

a pair of arms keyed to said shaft for rotation therewith and spaced from each other along said shaft, said arms each extending radially from said shaft and generally parallel to each other; and a plate supporting shaft extending between, and journaled in, said pair of arms at points radially spaced therealong from said rotatably mounted shaft, said plate supporting shaft being secured to said elongated flap folding plate along one of the longitudinal edges thereof.

19. Apparatus as claimed in claim 17 and further characterized to include a bearing block pivotally journaling said other end of said crank arm and slidably mounted on said crank arm adjacent the radially outer end thereof for sliding movement along said cam arm toward and away from the axis of concentric rotation of said cam arm; and means resiliently biasing said bearing block outwardly on said cam arm away from the axis of concentric rotation of said cam arm.

20. Apparatus as claimed in claim 17 wherein said bag conveying and supporting means comprises:

a rotatably mounted finishing cylinder having its rotational axis extending substantially parallel to the rotational axis of said rotating means; and a plurality of pairs of clamps positioned at the periphery of said finishing cylinder and circumferentially spaced therearound.

21. Apparatus as claimed in claim 18 wherein said pair of arms are each keyed to said rotatably mounted shaft at points intermediate their length, and wherein said apparatus is further characterized in including counterbalancing means carried by said pair of arms on the opposite side of said rotatably mounted shaft from said plate supporting shaft.

22. A machine for making gusseted bags having bottoms formed by folded flaps comprising:

a rotatably mounted finishing cylinder;

circumferentially spaced pairs of spring-biased, cam actuated clamps carried by said cylinder at the periphery thereof, the individual clamps in each pair of clamps being spaced circumferentially on said cylinder for clamping a partially formed bag along two spaced, parallel fold lines;

a first tucker mechanism positioned adjacent the periphery of said cylinder and comprising a tucker blade carried by said tucker arms for rotation around said first shaft axis and cooperating at one point in time during such rotation with the trailing clamp of each of said pairs of clamps;

a second tucker mechanism positioned adjacent the periphery of said finishing cylinder and spaced circumferentially around said finishing cylinder from said first tucker mechanism, said second tucker mechanism comprising:

a second rotatably mounted shaft;

tucker arms keyed to said second shaft for rotation therewith and extending radially therefrom; and a tucker blade carried by said tucker arms for rotation around said second shaft axis and cooperating at one point in time during such rotation with the leading clamp of each of said pairs of clamps;

a trailing flap folding mechanism positioned adjacent said finishing cylinder and spaced circumferentially around said cylinder from said second tucker mechanism in the opposite direction from said first tucker mechanism, said trailing flap folding mechanism comprising:

a third rotatably mounted shaft spaced radially outwardly from the periphery of said finishing cylinder and extending substantially parallel to the axis of rotation of said finishing cylinder;

an elongated flap folding plate extending substantially parallel to said third rotatably mounted shaft;

means interconnecting said flap folding plate and said third rotatably mounted shaft for rotating said plate about the axis of said third rotatably mounted shaft as said third shaft is rotated, said means including means pivotally supporting said flap folding plate for pivotation about an axis extending parallel to the rotational axis of said finishing cylinder;

means rotatably mounted on said third rotatably mounted shaft for pivoting said flap folding plate on its pivotal axis to extend said plate toward said finishing cylinder from said pivotal axis at some time during the portion of one revolution of the shaft of said flap folding mechanism when said plate is moving toward said finishing cylinder, and for about one-fourth of a revolution thereafter, and to pivotally retract said plate toward said third rotatably mounted shaft over at least a part of the remaining portion of said one revolution;

a leading flap folding element positioned adjacent said finishing cylinder and spaced circumferentially around said cylinder from said trailing flap folding mechanism; and means synchronously driving said finishing cylinder, the rotatably mounted shafts of said tucker mechanisms and the rotatably mounted shaft of said trailing flap folding mechanism whereby the speed of rotation of said tucker mechanism shafts is equal to the speed of rotation of said finishing cylinder multiplied by the number of clamp pairs thereon, and the speed of rotation of said flap folding mechanism shaft is sufficient to impart a linear velocity to said flap folding plate which is substantially faster than the linear velocity of a point on the periphery of said finishing cylinder.

References Cited by the Examiner

UNITED STATES PATENTS

| | | | |
|---|---|---|---|
| 1,181,294 | 5/16 | Dulin | 93—27 |
| 1,690,626 | 11/28 | Duvall | 93—21 |
| 2,126,920 | 8/38 | Potdevin | 93—22 |
| 2,268,921 | 1/42 | Bischuff et al. | 93—27 |
| 3,121,374 | 2/64 | Searle et al. | 93—22 |

FRANK E. BAILEY, *Primary Examiner.*